United States Patent
Suzuki et al.

(10) Patent No.: US 11,973,412 B2
(45) Date of Patent: Apr. 30, 2024

(54) POWER CONVERSION DEVICE

(71) Applicant: Hitachi Industrial Equipment Systems Co., Ltd., Tokyo (JP)

(72) Inventors: Kouga Suzuki, Tokyo (JP); Toshihiko Yamamoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 125 days.

(21) Appl. No.: 17/908,980

(22) PCT Filed: Feb. 26, 2021

(86) PCT No.: PCT/JP2021/007547
§ 371 (c)(1),
(2) Date: Sep. 2, 2022

(87) PCT Pub. No.: WO2021/177193
PCT Pub. Date: Sep. 10, 2021

(65) Prior Publication Data
US 2023/0099816 A1  Mar. 30, 2023

(30) Foreign Application Priority Data
Mar. 2, 2020  (JP) ................. 2020-035127

(51) Int. Cl.
*H02M 5/458*  (2006.01)
*H02M 1/00*  (2006.01)
(Continued)

(52) U.S. Cl.
CPC ........... *H02M 1/0016* (2021.05); *H02M 1/14* (2013.01); *H02M 1/36* (2013.01); *H02M 5/4585* (2013.01); *H02M 7/42* (2013.01); *H02M 7/5395* (2013.01)

(58) Field of Classification Search
CPC .... H02M 5/453; H02M 5/458; H02M 5/4585; H02M 7/2173; H02M 7/2176; H02M 7/5395
See application file for complete search history.

(56) References Cited

U.S. PATENT DOCUMENTS 9,837,924 B1 * 12/2017 Wei .................. H02M 7/125
2012/0170333 A1 * 7/2012 Bando ............... H02M 7/5395
363/56.01

(Continued)

FOREIGN PATENT DOCUMENTS

JP         7-59359 A     3/1995
JP     2006-352965 A    12/2006
(Continued)

OTHER PUBLICATIONS

International Search Report (PCT/ISA/210) issued in PCT Application No. PCT/JP2021/007547 dated Apr. 27, 2021 with English translation (four (4) pages).
Japanese-language Written Opinion (PCT/ISA/237) issued in PCT Application No. PCT/JP2021/007547 dated Apr. 27, 2021 (four (4) pages).
(Continued)

*Primary Examiner* — Gary A Nash
(74) *Attorney, Agent, or Firm* — Crowell & Moring LLP

(57) ABSTRACT

This power conversion device has: a main breaker and a main electromagnetic contactor connected to a main power supply; a converter body having a switching element; a power supply-side reactor and a device body-side reactor connected to the main electromagnetic contactor; a current detector; a smoothing capacitor; a DC voltage detector that detects a voltage of the smoothing capacitor; a control unit; and accessories. The accessories have: a power-supply phase detection transformer that detects the phase and the amplitude of a power supply voltage; a current limiting resistor that suppresses rush current to the smoothing capacitor at an initial turning-on stage of the main power supply; an electromagnetic contactor which is for turning on current lim- (Continued)

iting operation and which connects the current limiting resistor and the main power supply; and a filter circuit that removes current ripples caused by switching of the switching element. The main breaker, the main electromagnetic contactor, and an input terminal of the power-supply phase detection transformer in the accessories are connected to one another. The power supply-side reactor, the device body-side reactor, and a filter terminal in the accessories are connected to one another.

10 Claims, 10 Drawing Sheets

(51) Int. Cl.
*H02M 1/14* (2006.01)
*H02M 1/36* (2007.01)
*H02M 7/5395* (2006.01)
*H02M 7/42* (2006.01)

(56) References Cited

U.S. PATENT DOCUMENTS

| | | | |
|---|---|---|---|
| 2015/0365010 A1* | 12/2015 | Abe | H02M 1/36 363/37 |
| 2016/0359424 A1* | 12/2016 | Tran | H02M 1/12 |
| 2017/0070158 A1* | 3/2017 | Kato | H02M 7/08 |
| 2018/0076731 A1* | 3/2018 | Morin | H02M 3/157 |

FOREIGN PATENT DOCUMENTS

| | | |
|---|---|---|
| JP | 2011-55571 A | 3/2011 |
| JP | 2014-195375 A | 10/2014 |
| JP | 2015-42053 A | 3/2015 |

OTHER PUBLICATIONS

Japanese-language Office Action issued in Japanese Application No. 2022-505192 dated Aug. 22, 2023 with English translation (6 pages).

\* cited by examiner

F I G. 5
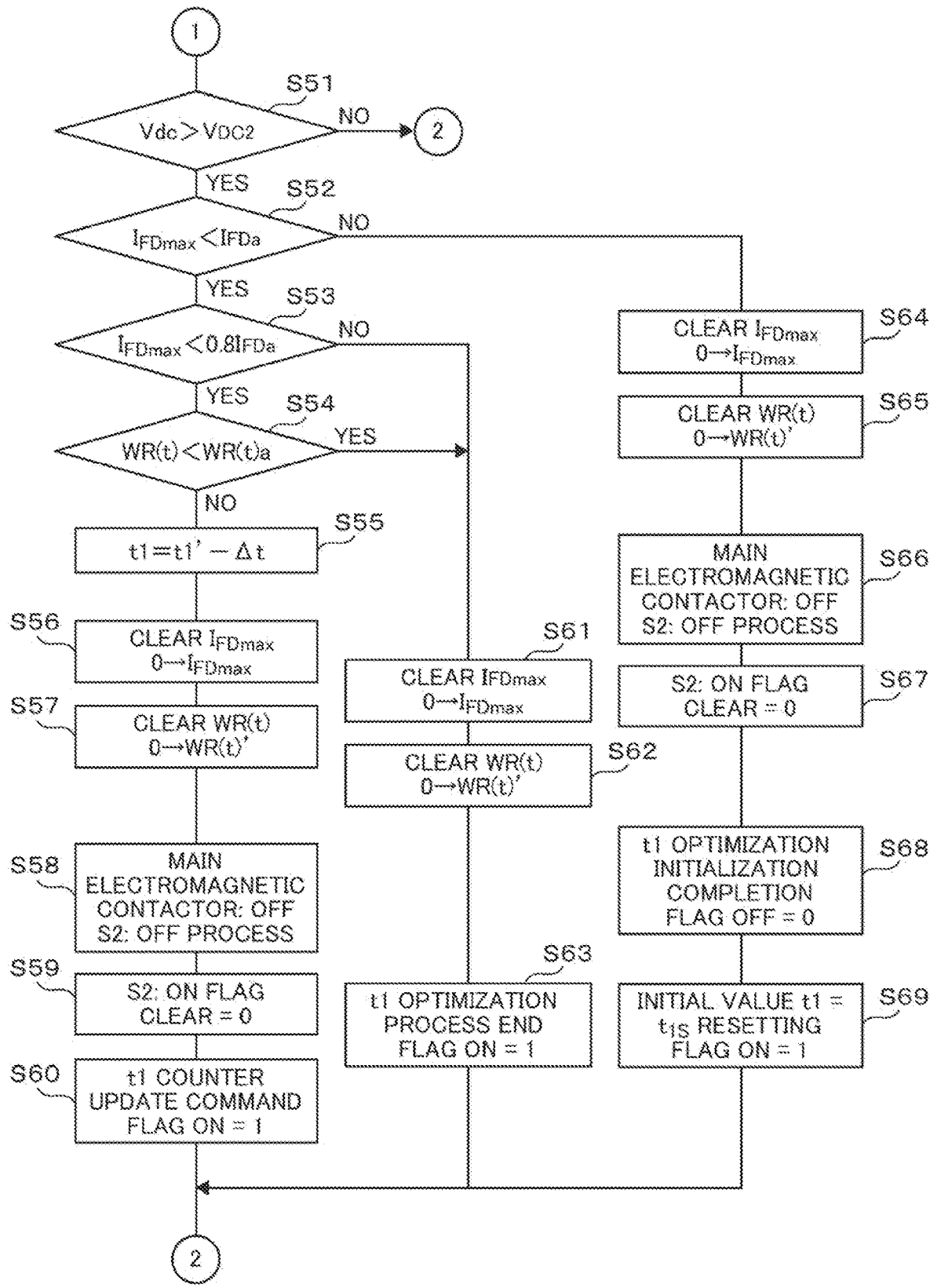

POWER CONVERSION DEVICE

TECHNICAL FIELD

The present invention relates to a power conversion device, and more particularly to initial charging of the power conversion device.

BACKGROUND ART

As a device that supplies power to a DC unit of an inverter device or regenerates feedback power from a direct current of an inverter to a power supply, there is a sinusoidal PWM converter for power supply regeneration, a high power factor, and harmonic suppression. In addition, there is an uninterruptible power supply device that guarantees power in the event of a power outage. Patent Document 1 is an example of a PWM converter that initially charges a DC unit in a process of an initial stage before starting a PWM operation in these power conversion devices.

Patent Document 1 relates to an initial charging technology for a DC unit when a DC unit smoothing capacitor of an inverter device is added.

CITATION LIST

Patent Document

Patent Document 1: JP 2015-42053 A

SUMMARY OF THE INVENTION

Problems to be Solved by the Invention

In general, a sinusoidal PWM converter includes a converter body part having a main switching element and a control unit, an initial charging circuit part that performs initial charging of a DC unit of the converter body, and a filter circuit part having two types of reactors, a damping resistor, and a filter capacitor.

In these configurations, a part excluding the converter body and the two types of reactors is generally treated as an accessory part, and there is a sinusoidal PWM converter that separately provides components included in the accessory part, and a sinusoidal PWM converter that puts the accessory part together and provides the accessory part as a separate unit from the converter body. However, all of the products have problems such as not being able to respond to space saving required for this accessory part, wiring saving, and high reliability.

As a factor for not saving space, as illustrated in FIG. 9 of Patent Document 1, a current limiting resistance for the purpose of suppressing a maximum value of an initial charging current and allowing the current to flow, and an electromagnetic contactor MC2 for short-circuiting both ends of the current limiting resistor after the initial charging are inserted in series into a main power supply line. Due to such a configuration, a power current during operation needs to be passed through the electromagnetic contactor MC2, and as a result, a rated current of the electromagnetic contactor MC2 needs to be proportional to the rated capacity of the device body.

The configuration illustrated in Patent Document 1 has a problem in that space saving cannot be achieved.

An object of the invention is to provide a power conversion device capable of saving space.

Solutions to Problems

A preferable example of the invention is a power conversion device including a main breaker and a main electromagnetic contactor connected to a main power supply, a converter body having a switching element, a power supply-side reactor and a device body-side reactor connected to the main electromagnetic contactor, a current detector, a smoothing capacitor, a DC voltage detector that detects a voltage of the smoothing capacitor, a control unit, and accessories, in which the accessories include a power-supply phase detection transformer that detects a phase and an amplitude of a power supply voltage, a current limiting resistor that suppresses rush current to the smoothing capacitor at an initial turning-on stage of the main power supply, an electromagnetic contactor for turning on a current limiting operation, the electromagnetic contactor connecting the current limiting resistor and the main power supply, and a filter circuit that removes current ripples caused by switching of the switching element, the main breaker, the main electromagnetic contactor, and an input terminal of the power-supply phase detection transformer in the accessories are connected to one another, and the power supply-side reactor, the device body-side reactor, and a filter terminal in the accessories are connected to one another.

Effects of the Invention

According to the present invention, space saving can be realized.

BRIEF DESCRIPTION OF THE DRAWINGS

FIG. 5 is a diagram illustrating a control flowchart 3.

MODE FOR CARRYING OUT THE INVENTION

Hereinafter, embodiments will be described with reference to the drawings.

First Embodiment

Figure 1:
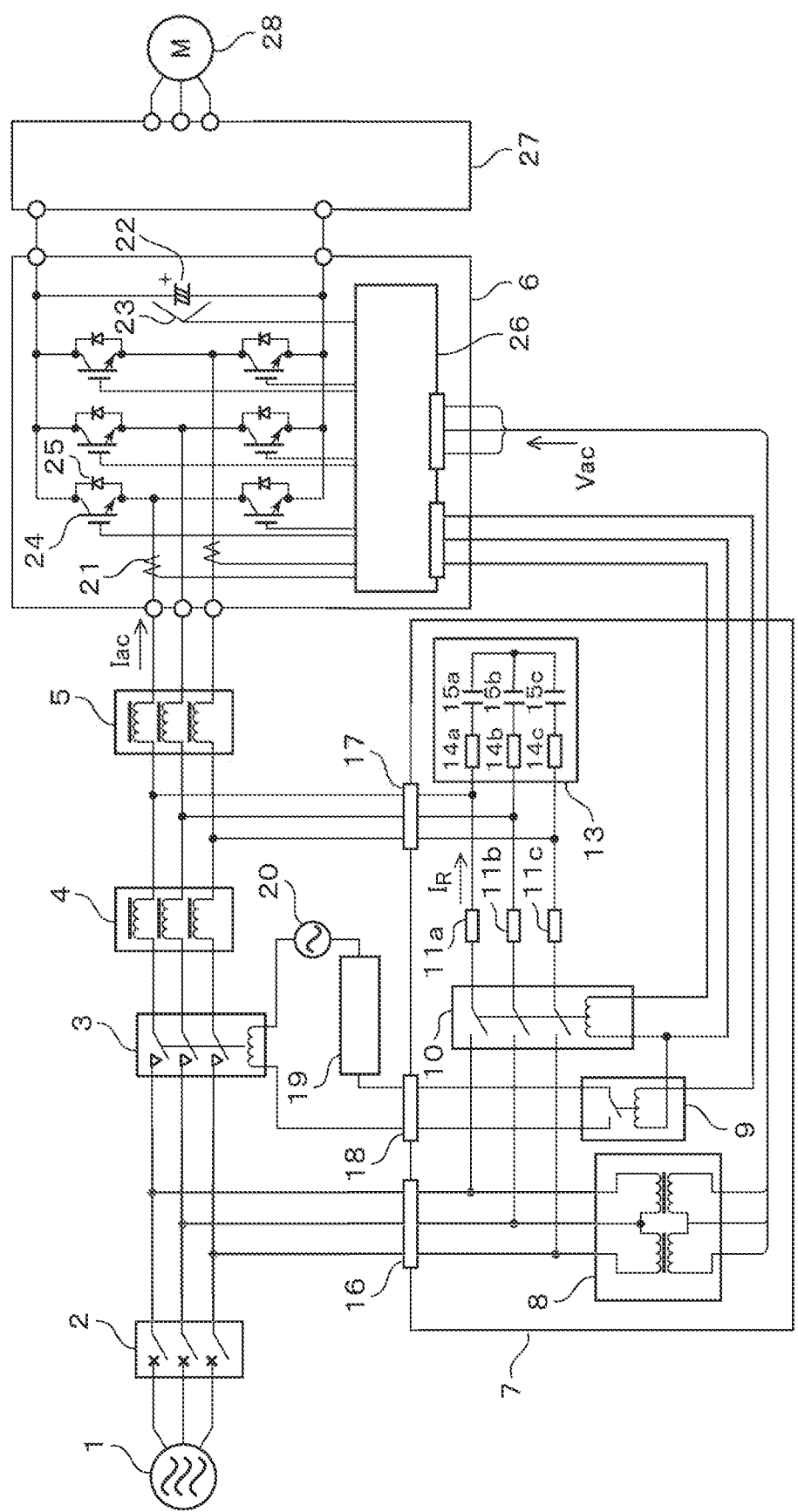
FIG. 1 is a diagram illustrating a circuit configuration of a power conversion device of a first embodiment.

FIG. 1 is a diagram illustrating a circuit configuration of a power conversion device in a first embodiment.

The power conversion device of FIG. 1 includes a main breaker 2 connected to an AC main power supply 1, a main electromagnetic contactor 3 connected to the main breaker 2, a power supply-side reactor 4 connected to the main electromagnetic contactor 3, a device body (sinusoidal PWM converter) 6 which is a converter body capable of converting alternating current to direct current and direct current to alternating current in both directions, a device body-side reactor 5 connected to the device body 6, and accessories 7. The power conversion device supplies power to an inverter 27 and a motor 28. In addition, feedback energy from the inverter 27, which is a load, is regenerated to the main power supply 1 side by the power conversion device.

The device body 6, which is the converter body, includes six sets of main switching elements, in each of which an IGBT element 24 and a flywheel diode 25 are connected in parallel, a smoothing capacitor 22 of a main circuit DC voltage unit, a current detector 21 for detecting an AC current Iac, a DC voltage detector 23 for detecting a DC voltage Vdc which is a DC voltage of the smoothing capacitor 22, and a control unit 26. The DC voltage detector 23 is a means for knowing a charging voltage level.

The accessories 7 include a power-supply phase detection transformer input terminal 16 that connects the main breaker 2, the main electromagnetic contactor 3, the power-supply phase detection transformer 8, etc. to one another, a power-supply phase detection transformer 8 for detecting an amplitude and a phase of a power supply voltage, an electromagnetic contactor 10 for turning on a current limiting operation for starting an initial charging operation, current limiting resistors 11a to 11c, a filter circuit 13 assembled with damping resistors 14a to 14c and filter capacitors 15a to 15c, an auxiliary electromagnetic contactor 9 for turning on the main electromagnetic contactor for the purpose of outputting an auxiliary interlock signal for turning on the main electromagnetic contactor 3, and a filter terminal 17 that connects the power supply-side reactor 4, the device body-side reactor 5, and the filter circuit 13 to one another. The filter circuit 13 is connected to a common connection point between the power supply-side reactor 4 and the device body-side reactor 5 to remove current ripples generated when a switching element of the converter body switches.

In the above configuration, as a process before the IGBT element starts switching and enters a PWM operation, first, it is necessary to perform initial charging of the smoothing capacitor 22 in a DC unit. However, it is necessary to prevent a rush current to the smoothing capacitor 22 from occurring in this process. The reason will be described below.

For example, when the main electromagnetic contactor 3 is connected to the main power supply 1 before the electromagnetic contactor 10 for turning on a current limiting operation without passing through a circuit of the accessories 7 illustrated in FIG. 1, excessive current flows into the smoothing capacitor 22 by passing through the power supply-side reactor 4 and the device body-side reactor 5, which are two types of reactors, and the flywheel diode 25 of the main switching element by the main power supply 1 via the main electromagnetic contactor 3. In this case, the flywheel diode 25 exceeds an overcurrent tolerance and the smoothing capacitor 22 deteriorates. Therefore, a function of the accessories 7 is needed. Hereinafter, an operation function of the accessories 7 will be described.

According to the present embodiment, an inflow path of an initial charging current starts from the main power supply 1 and the main breaker 2, enters the accessories 7 without passing through the main electromagnetic contactor 3, and proceeds through the input terminal 16 of the power-supply phase detection transformer 8, the electromagnetic contactor 10 for turning on the current limiting operation, the current limiting resistors 11a to 11c, the filter terminal 17, the device body-side reactor 5, the flywheel diode 25 of the main switching element, and the smoothing capacitor 22.

Figure 2:
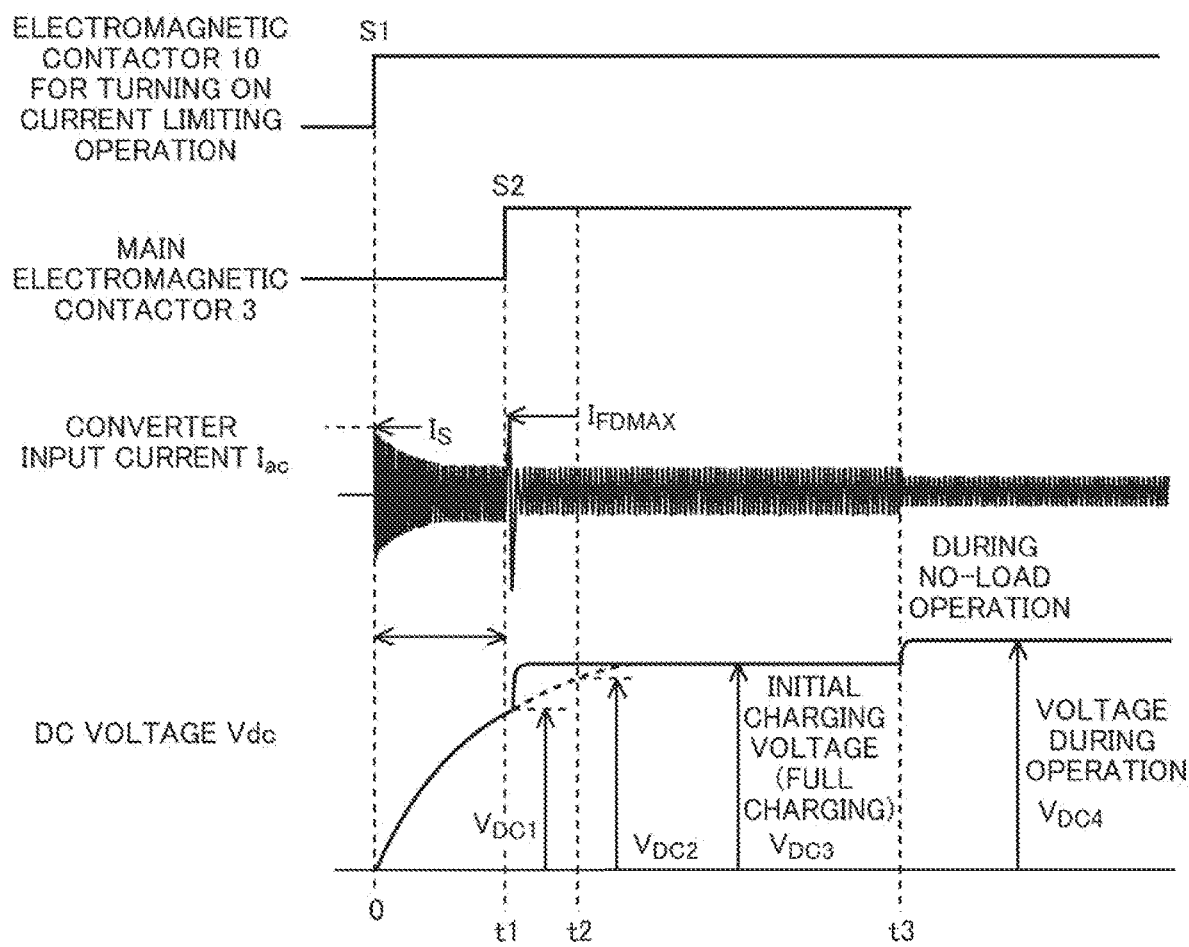
FIG. 2 is a diagram illustrating an initial charging turning-on waveform.

Further, an operation process at this time is illustrated in FIG. 2 on a time chart. Hereinafter, an initial charging operation will be illustrated with reference to FIG. 2.

First, when an operation preparation signal RDY is given to the control unit 26 at time t=0 on the time chart, the control unit 26 confirms an input level of a power supply voltage $V_{ac}$ from detection information from the power-supply phase detection transformer 8, and performs a control operation so that an operation-on command $S_1$ of the electromagnetic contactor 10 for turning on the current limiting operation is output. When a main contact of the electromagnetic contactor 10 for turning on the current limiting operation of the accessories is closed by this $S_1$, the initial charging current flows into the smoothing capacitor 22 through the inflow path of the initial charging current described above. Due to this charging current, the DC voltage Vdc of the smoothing capacitor 22 in the DC unit rises.

Here, when a capacitance of the smoothing capacitor 22 is set to $C_B$, and a capacitance of the filter capacitor 15 (15a, 15b, and 15c) is set to $C_f$, the value $C_B$ is overwhelmingly larger than the value $C_f$, and thus an effect of $C_f$ on the initial charging operation is negligible. Therefore, when a power supply voltage is set to $V_{ac}$, a resistance value for one phase of the current limiting resistor is set to $R_S$, and time when an operation of the electromagnetic contactor 10 for turning on the current limiting operation is turned on is set to time 0, a DC voltage rising process $Vdc_{(t)}$ rises exponentially as illustrated in the following approximate equation [Equation 1].

$$Vdc_{(t)} \approx \sqrt{2} \times V_{ac}\{1-e^{-(t/\tau)}\} \text{ [V]} \qquad \text{[Equation 1]}$$

In [Equation 1], an electrical time constant T is expressed by the following [Equation 2].

$$\tau \approx C_B \times \sqrt{3} \times R_S \text{ [s]} \qquad \text{[Equation 2]}$$

Further, on the time chart of FIG. 2, since time $t_2$ at which the DC voltage Vdc becomes a charging voltage value $V_{DC2}$ of the DC unit considered to have reached a convergence value of full charge can be approximated to the full charge, hereinafter, the time is expressed as a deemed full charging time. The deemed full charging time is about $3\tau$, which is three times the electrical time constant $\tau$, and the charging voltage value $V_{DC2}$ of the DC unit at time $t_2$ is a value obtained by substituting $t_2$ into a part t of [Equation 1].

In addition, on the same time chart, a maximum value of a charging current $I_S$ at the start of initial charging is approximated by the following [Equation 3], and an attenuation process of a current $I_{R(t)}$ passing through the current limiting resistor is as illustrated in [Equation 4] assuming that the power supply voltage V does not change over time.

$$I_{R(max)} \approx \sqrt{2} \times V_{ac}/(\sqrt{3} \times R_S) \text{ [A]} \qquad \text{[Equation 3]}$$

$$I_{R(t1)} \approx I_{smax} e^{(t1/\tau)} \approx \sqrt{2} \times V_{ac}/(\sqrt{3} \times R_S) e^{(t1/\tau)} \text{ [A] [Equation 4]}$$

The meaning of [Equation 4] is that a maximum value of the current $I_{R(t)}$ passing through the current limiting resistor is $I_{s(max)}$, a flowing period in the attenuation process is until time t1 when the main electromagnetic contactor 3 is turned on, and then the initial charging current is switched to a main contact passing current of the main electromagnetic contactor 3.

Here, when the main electromagnetic contactor 3 is turned on at time $t_2$, a starting time of the power conversion device is lengthened, which is impractical. In particular, in order to suppress a current flowing through the electromagnetic contactor 10 for turning on the current limiting operation, it is desirable to increase resistance values of the current limiting resistors 11a to 11c. However, the suppression causes a delay in a PWM operation start time $t_3$, which impairs practicality. Therefore, the main electromagnetic contactor 3 is turned on at t1 which is a time during charge establishment instead of at the deemed full charging time $t_2$ when Vdc becomes $V_{DC2}$.

As a mechanism for turning on the main electromagnetic contactor 3, under the condition that an operation circuit power supply 20 of the main electromagnetic contactor 3 and an interlock signal 19 have already been established, a signal S2 is applied from the control unit 26 to the auxiliary electromagnetic contactor 9 for turning on the main electromagnetic contactor of the accessories 7 to turn on the auxiliary electromagnetic contactor 9 for turning on the main electromagnetic contactor, and the main electromagnetic contactor 3 is turned on by a main contact of the auxiliary electromagnetic contactor 9 for turning on the main electromagnetic contactor.

An issue here is how to implement time t1 when the main electromagnetic contactor 3 is turned on, that is, a timing at which the signal $S_2$ is output from the control unit 26. Here, when t1 can be shortened earlier than time $t_2$, the power load on the current limiting resistors 11a to 11c can be reduced, and a DC voltage establishment time can be shortened. Thus, it is less likely to affect a delay to time $t_3$. Furthermore, it is possible to reduce the load of a main contact passing current of the electromagnetic contactor 10 for turning on the current limiting operation. However, shortening $t_j$ causes the following problems.

That is, as t1 is shortened, a difference voltage ΔV between a voltage $V_{DC1}$ in the middle of the DV voltage and a full charging voltage $V_{DC3}$ (=√2×Vac) increasingly becomes large. When the main electromagnetic contactor 3 is turned on at time t1, an excess current $I_{FDMAX}$ passes through the main electromagnetic contactor 3, the power supply-side reactor 4, the device body-side reactor 5, and the flywheel diode 25 of the main switching element, and flows into the smoothing capacitor 22. A peak value of this current is suppressed to some extent by the two types of the power supply-side reactor 4 and the device body-side reactor 5. However, the peak value becomes larger than $I_{s(max)}$ illustrated in [Equation 3] depending on the magnitude of the differential voltage ΔV.

Therefore, it is important to confirm soundness as to whether the excess current $I_{FDMAX}$ exceeds an allowable passing current value $I_{FDa}$ of the flywheel diode 25 by shortening $t_1$.

Note that an allowable passing current of the main electromagnetic contactor 3 and an allowable current flowing into the smoothing capacitor 22 generally have a withstand value larger than $I_{FDa}$. Thus, even when a current limiting resistance value $R_S$ is increased so that $I_{FDMAX}$ is kept within the allowable passing current value $I_{FDa}$, if initial charging is performed with t1 shortened, the power load on the current limiting resistors 11a to 11c can be reduced, and an influence on a long charging time can be prevented, which is the aim of the present embodiment.

Here, an issue is an extent to which a selection value of rated power of the resistance values of the current limiting resistors 11a to 11c can be decreased, and it is sufficient to verify whether a loss $W_{R(t1)}$ generated in the current limiting resistance value does not exceed an allowable loss $W_{Ra}$ of the current limiting resistance value from time zero when the electromagnetic contactor 10 for turning on the current limiting operation is turned on until time t1 as illustrated in [Equation 5].

$$W_{R(t1)} \approx -(1/2) \times C_B \times (\sqrt{2}V_{ac})^2 \times \{(e^{-(Zt1/(\sqrt{3} \times C_B \times RS))}) - (\varepsilon^{-(0/\sqrt{3} \times C^{B \times RS})})\} \text{ [J]}$$ [Equation 5]

$$W_{Ra} > W_{P(t1)} \text{ [J]}$$ [Equation 6]

From the above point of view, optimization control of time $t_1$, at which the main electromagnetic contactor 3 is turned on, is performed so that minimization of an integrated loss of the current limiting resistors 11a to 11c generated during initial charging and soundness of a value $I_{FD(max)}$ of a current passing through the flywheel diode 25 of the main switching element are optimized in terms of trade-offs.

Figure 3:
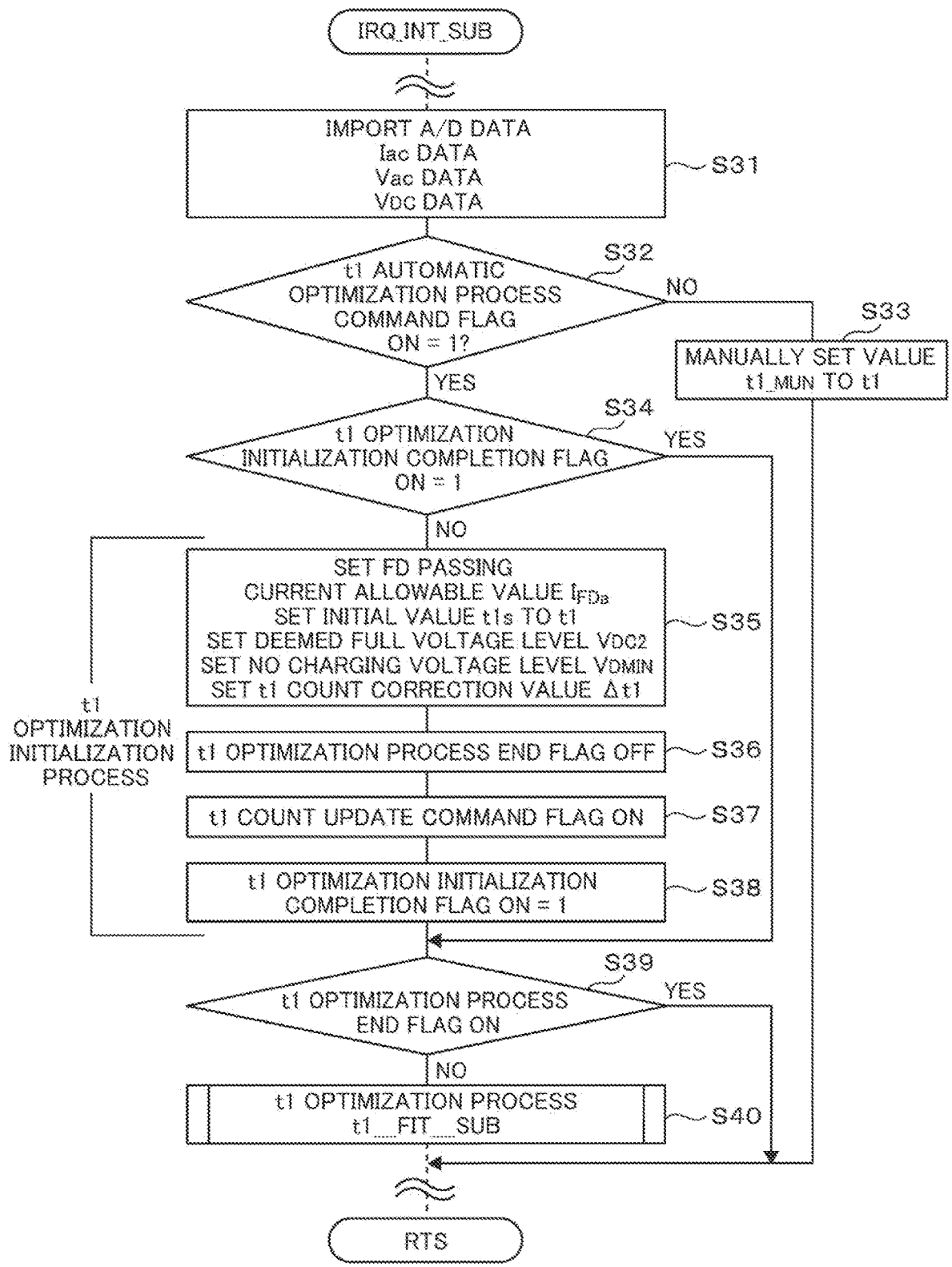
FIG. 3 is a diagram illustrating a control flowchart 1.
Figure 4:
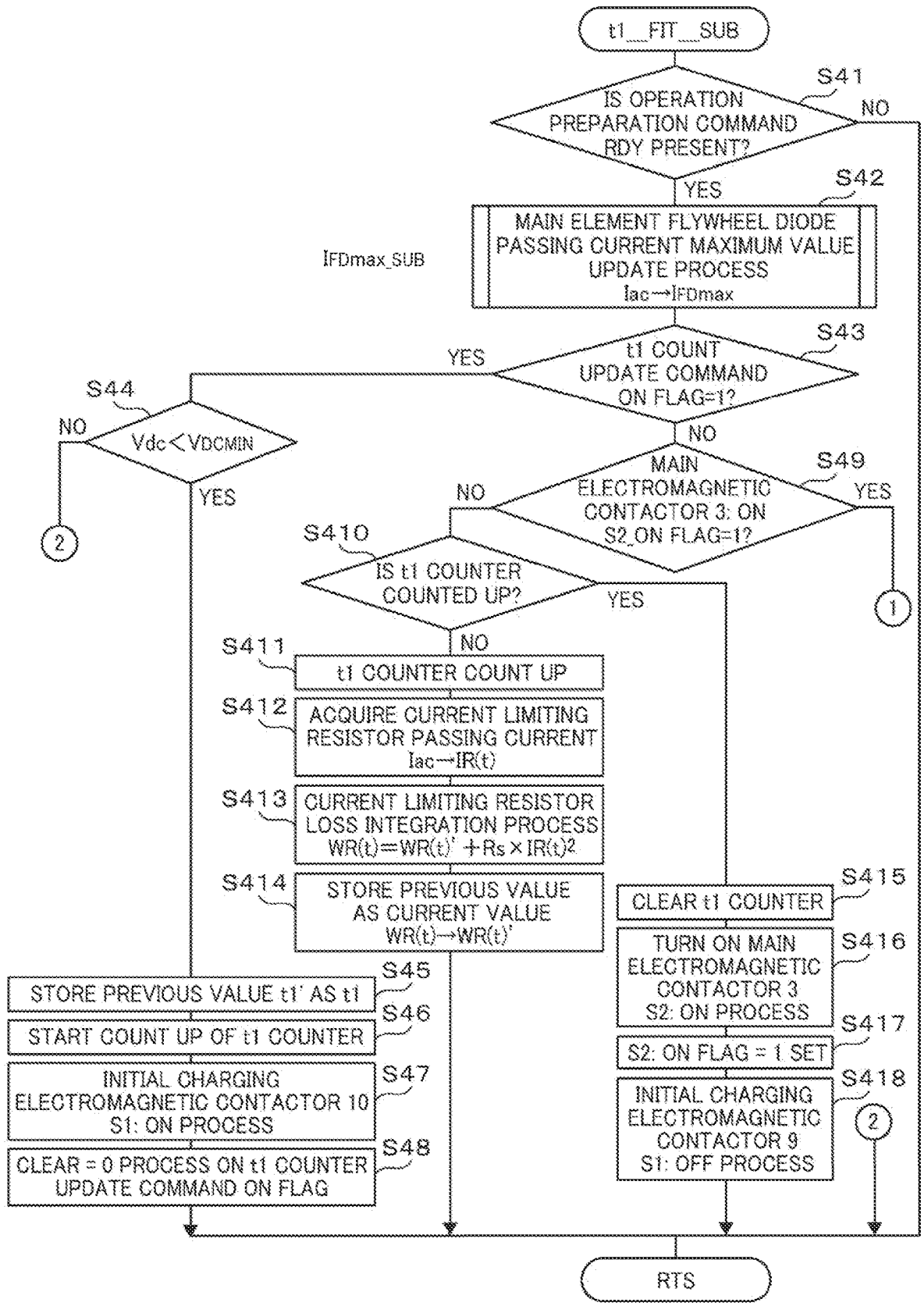
FIG. 4 is a diagram illustrating a control flowchart 2.

Specifically, a method is adopted in which control flows illustrated in FIGS. 3, 4 and 5 are carried out, and the signal $S_2$ of the turning-on command to the main electromagnetic contactor 3 is output by the obtained minimum t1. Alternatively, a method is adopted in which the optimum t1 is found in advance by an experiment, the optimum t1 is given as a manual set value of t1, and the signal S2 is output at this time t1. Alternatively, it is possible to adopt a method in which $V_{DC1}$ at the optimum time t1 is found by experiment in advance, a ratio of √2 times the power supply voltage $V_{ac}$ during experiment to $V_{DC1}$ is set as an optimum ratio difference kp, the optimum ratio difference kp is given as a manual set value, and the signal $S_2$ is output when a condition of the following equation is satisfied.

$$V_{dc(t1)} = V_{DC1} > V_{ac} \times \sqrt{2} \times kp \text{ [V]}$$ [Equation 7]

Next, a processing flow of an automatic $t_j$ optimization process for finding the optimum $t_1$ will be described with reference to FIGS. 3, 4, and 5. FIGS. 3, 4, and 5 are flowcharts executed by the control unit 26. The control unit includes a microcomputer, etc., and a CPU (Central Processing Unit) executes a program corresponding to the flowcharts of FIGS. 3, 4, and 5. At least one or all of the flowcharts of FIGS. 3, 4, and 5 may be configured by hardware such as ASIC (Application Specific Integrated Circuit) or FPGA (Field Programmable Gate Array).

The control unit 26 determines time t1 at which the main electromagnetic contactor 3 is turned on based on detection information such as the power supply voltage $V_{ac}$ detected by the power-supply phase detection transformer 8, the AC current Iac detected by the current detector 21, and the DC voltage Vdc detected by the DC voltage detector 23, and performs a control operation to turn on the main electromagnetic contactor 3 according to t1.

Alternatively, a control operation may be performed to obtain the turning-on time t1 in advance, give the obtained t1 to the control unit 26 as a manual set value, and turn on the main electromagnetic contactor 3 according to the set value. FIGS. 3, 4, and 5 are flowcharts illustrating processing in the control unit 26.

In the automatic $t_1$ optimization process, first, in a high-speed control periodic process IRQ_INT_SUB of FIG. 3, after an initialization process (S35 to S38), a subroutine t1_FIT_SUB is called to perform the $t_1$ optimization process (S40). When the optimization process is completed, an end flag is turned on (S38), and then the periodic process is exited.

Further, as a condition for performing this automation process, first, it is determined whether to perform the automation process or manual setting, and when a flag of an automation process command is ON (YES in S32), the automation process is started. When the manual setting is selected (NO in S32), the optimum t1 found in advance in the experiment is manually set as described above (S33).

At the start of the automatic process, an initialization process is performed by preparing in advance for processing in t1_FIT_SUB (S35 to S38). Here, various variables required for the t1 optimization process are initialized and various flags are initialized. When initialization settings are made once, the process is passed and is not executed from a next cycle.

The subroutine IRQ_INT_SUB is called every control cycle until an optimum value of t1 is found and an optimization processing end flag is turned ON, and the processes illustrated in FIGS. 4 and 5 are performed.

In the process of FIG. 4, first, it is determined whether or not there is an operation preparation signal RDY (S41). Processing starts only when there is the operation preparation signal RDY. A reason therefor is that, basically, when this signal is not present, initial charging is not started. That is, when there is no RDY (No in S41), the routine is immediately exited and a next call is waited (return subsystem (RTS)).

Next, when ON of the operation preparation signal RDY is confirmed (YES in S41), a subroutine of processing for storing a maximum value current flowing through the flywheel diode 25 is called to perform the following processing (S42).

In the processing here, the AC current $I_{ac}$ detected by the current detector 21 is stored as an initial current value $I_{FD(max)}$, and when $Iac_{(t)}$ captured in this cycle exceeds previously stored $I_{FD(max)}$, $Iac_{(t)}$ of this time is rewritten as $I_{FD(max)}$. When $Iac_{(t)}$ is not exceeded, the write change of $I_{FD(max)}$ is not performed. In this way, the maximum passing current value of the flywheel diode 25 generated during a period in which the call of t1_FIT_SUB is repeated while the operation preparation signal RDY is ON is stored and held.

After passing the above subroutine processing, first, the control unit 26 determines whether a flag t1 counter update command flag, which is for determining whether to update a count value t1 of a t1 counter, is ON=1 (S43).

At the time of the first pass, since the t1 counter update command flag ON=1 is set in the t1 optimization initialization process, it is determined whether the DC voltage $V_{dc}$ is equal to or less than an uncharged value $V_{DCMIN}$ (S44). When the DC voltage $V_{dc}$ is less than the uncharged value $V_{DCMIN}$ (YES in S44), t1' for storing and holding a previous value of the initial t1 of FIG. 3 is set (S45). A count-up (UP) start process (S46), an ON process of a command S1 for turning on the electromagnetic contactor for turning on the current limiting operation (S47), and a t1 counter update command flag OFF process (S48) are performed, and the routine is exited (RTS).

Since the t1 counter update command flag is OFF in the next cycle (NO in S43), it is determined whether the main electromagnetic contactor 3 is ON, that is, ON flag=1 of the signal S2 is determined (S49). Since time t1 has not passed, and the signal S2 is not turned on (NO in S49), a count UP process for updating the t1 count value is started (S411). Further, here, since the initial charge current corresponds to a period in which the current limiting resistor is passed through, Iac(t) is stored as a value of $I_{R(t)}$ during a cycle period until count UP is performed (S412). From the $I_{R(t)}$ and the resistance value $R_S$ of the current limiting resistor, a loss integration process of the current limiting resistor for one phase is performed by the following [Equation 8] (S413).

$$W_{R(t)} = W_{R(t)'} + R_S \times I_{R(t)}^2 \quad \text{[Equation 8]}$$

In [Equation 8], $W_{R(t)'}$ is a previous value of $W_{R(t)}$, and the loss is accumulated until the cycle times when the t1 counter is counted up. Further, this equation is also a process of digitally approximating an integration process of $W_{R(t1)}$ illustrated in [Equation 5].

When the count UP of the t1 counter reaches a count UP determination value (YES in S410), the t1 counter is cleared (S415). The main electromagnetic contactor 3 is turned on, that is, the signal S2 is turned on (S416). The ON flag of the signal $S_2$ is set (S417), and a cutoff process of the electromagnetic contactor 10 for turning on the current limiting operation, that is, an OFF process of $S_1$ is performed (S418).

When the above processing is performed, it is confirmed that the signal $S_2$ is ON in the next cycle (YES in S49). Thus, the process shifts from (1) of FIG. 4 to a research process of a t1 optimum value in (1) of FIG. 5. Here, first, it is determined that $V_{dc(t)} > V_{DC2}$ (S51). By the step of S51, the cycle routine is exited until the $V_{DC}$ becomes the deemed full charging voltage value $V_{DC2}$ (NO in S51). When deemed full charging is confirmed (YES in S51), L is called, and first, it is verified whether $I_{FDmax}$ is less than $I_{FDa}$ (S52).

In the initial setting, a value is selected as $t_{s1}$ so that $I_{FDmax}$ does not exceed $I_{FDa}$. However, when $t_{s1}$ is inappropriate and becomes more than $I_{FDa}$, various variables are cleared (S64 and S65), the main electromagnetic contactor 3 is turned off (S66), and ON=1 of an initialization completion flag set in FIG. 3 is set to OFF=0 (S68), thereby promoting reprocessing of optimization (S69).

Basically, $I_{FDmax} < 0.8 \times I_{FDa}$ is determined by an appropriate process of $t_{s1}$ (S53), and in the case of No in S52, the optimization is not completed (S64 to S69).

Here, $I_{FDmax} < 0.8 \times I_{FDa}$ is determined (S53) by increasing Rs and ts1. In the case of Yes in S53, $I_{FDmax} \ll I_{FDa}$, and thus an integrated loss $W_{R(t1)}$ generated in the current limiting resistor processed in FIG. 4 may be equal to or greater than an allowable value $W_{Ra}$ (NO in S54). Then, a set time of t1 is corrected by −Δt and set (S55). Further, various variables are cleared (S56, S57, and S59), the main electromagnetic contactor 3 is turned off (S58), the t1 counter update command flag is set to ON=1 (S60), and the routine is exited.

In such a state, t1 counter update command flag determination ON=1 of FIG. 4 is applied (YES in S43). However, when an elapsed time after the main electromagnetic contactor 3 is turned off is short, the voltage of the DC unit drops sufficiently. Therefore, after waiting for discharge of the DC unit by DC voltage determination $V_{dc} < V_{DCMIN}$ (S44), initial charging is redone.

The initial charging is redone with an updated value of t1. However, a series of operation processes is the same as illustrated above.

When this process determination is repeated, t1 is updated to be shorter, so that $I_{FDmax}$ increases every time−Δt is updated, and eventually determination $I_{FDmax} < 0.8 \times I_{FDa}$ is applied.

When $I_{FDmax}$ ax is $0.8 \times I_{FDa}$ or more in the determination $I_{FDmax} < 0.8 \times I_{FDa}$ (No in S53), appropriate research of t1 is completed (S61 to S63). The above description is an example of an implementation control flow.

By the above implementation, the initial charging current is minimized. As a result, since a current taken into a power supply phase detection transformer has been conventionally weak, a signal line of the power supply phase detection transformer and a wire for initial charging are separate wires, and sharing is not performed. With realization of minimization of current by the present embodiment, commonality becomes possible.

In addition, conventionally, the path has been different from an initial charging path in a wire of the filter circuit 13. A value of current flowing through the filter circuit 13 is as small as 1/10 or less of a rated current flowing through a main circuit, and even when an initial charging line path and a lead-in wire path to the filter circuit 13 are shared, the electromagnetic contactor for the initial charging is released from the power supply after the main electromagnetic contactor 3 is turned on. Thus, there is no influence on minimization of the initial charging current, and there is no influence on a filter function. Therefore, according to the present embodiment, it is possible to share the lead-in wire to the filter circuit 13 and the initial charging path. According to FIG. 1, a lead-in wire to the power-supply phase detection transformer 8 and a primary-side wire of the electromagnetic contactor 10 for turning on the current limiting operation are shared, a secondary-side wire of the electromagnetic contactor 10 for turning on the current limiting operation and an input-side wire of the current limiting resistors 11a, 11b, and 11c are shared, and an output-side wire of the current limiting resistors 11a, 11b, and 11c and the lead-in wire to the filter circuit 13 are shared.

According to the first embodiment, the main breaker, the main electromagnetic contactor, and the power-supply phase detection transformer input terminal of the accessories are connected to one another, the power supply-side reactor, the device body-side reactor, and the filter terminal of the accessories are connected to one another, so that it is possible to positively reduce a selected value of rated power of the current limiting resistor and a selected value of a rated current of the electromagnetic contactor, which are components required for the initial charging of the DC unit of the power conversion device. Further, since wires related to the power-supply phase detection transformer, an initial charging circuit, and the filter circuit can be shared, the power conversion device that realizes space saving and wiring saving related to the accessories 7 can be provided in the first embodiment.

Second Embodiment

Figure 6:
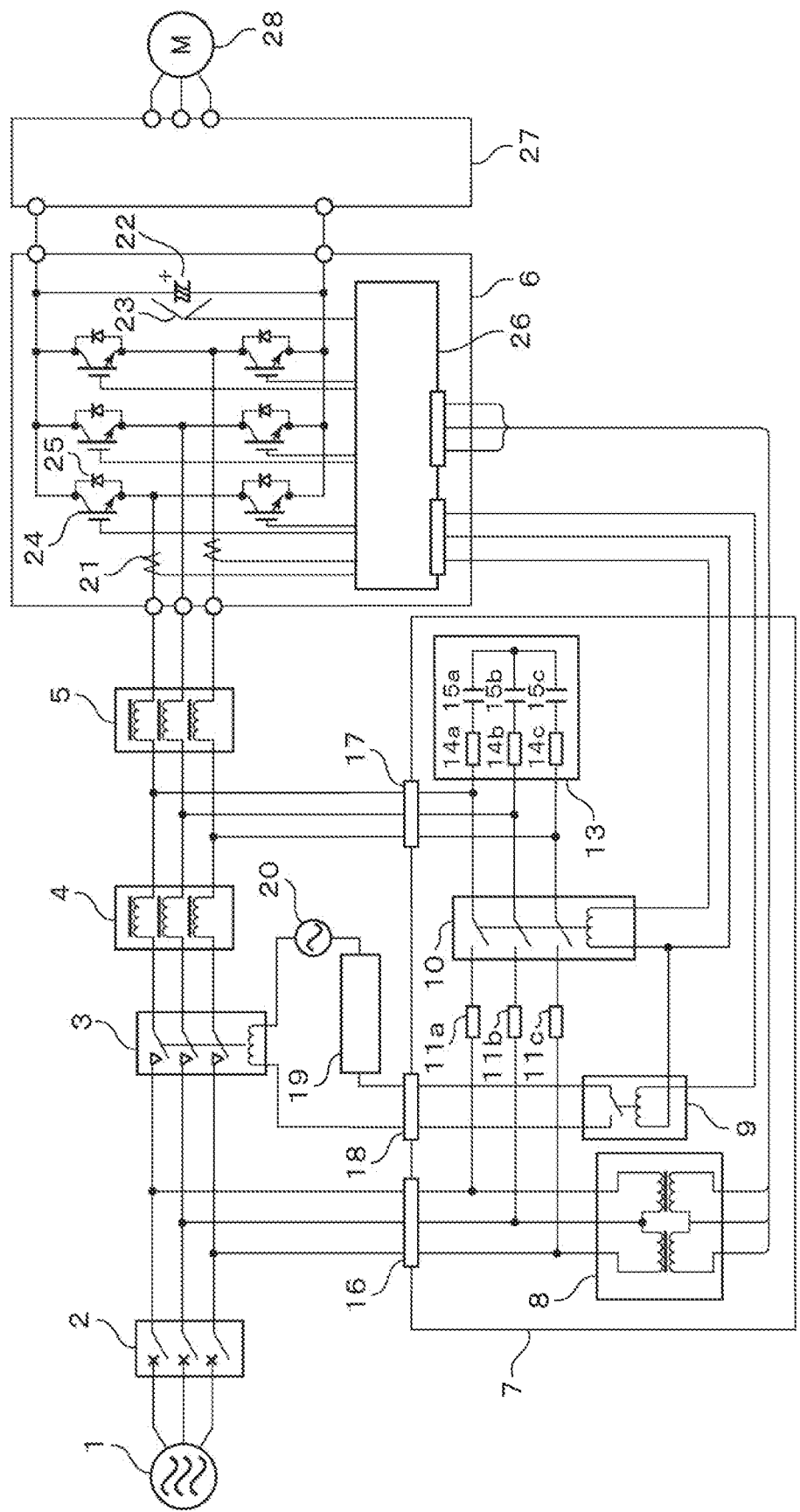
FIG. 6 is a diagram illustrating a circuit configuration of a power conversion device of a second embodiment.

FIG. 6 is a diagram illustrating a second embodiment. In FIG. 6, compared to FIG. 1, the electromagnetic contactor 10 for turning on the current limiting operation and the current limiting resistors 11a to 11c are simply switched back and forth as the initial charging path. In FIG. 6, a lead-in wire to the power-supply phase detection transformer 8, an input-side wire to the current limiting resistors 11a, 11b, and 11c are shared, a primary-side wire of the electromagnetic contactor 10 for turning on the current limiting operation and an output-side wire to the current limiting resistors 11a, 11b, and 11c are shared, and a secondary-side wire of the electromagnetic contactor 10 for turning on the current limiting operation and a lead-in wire to the filter circuit 13 are shared. According to the second embodiment, the time chart illustrated in FIG. 2 can be applied, and the same effect as that of the first embodiment can be obtained.

Third Embodiment

Figure 7:
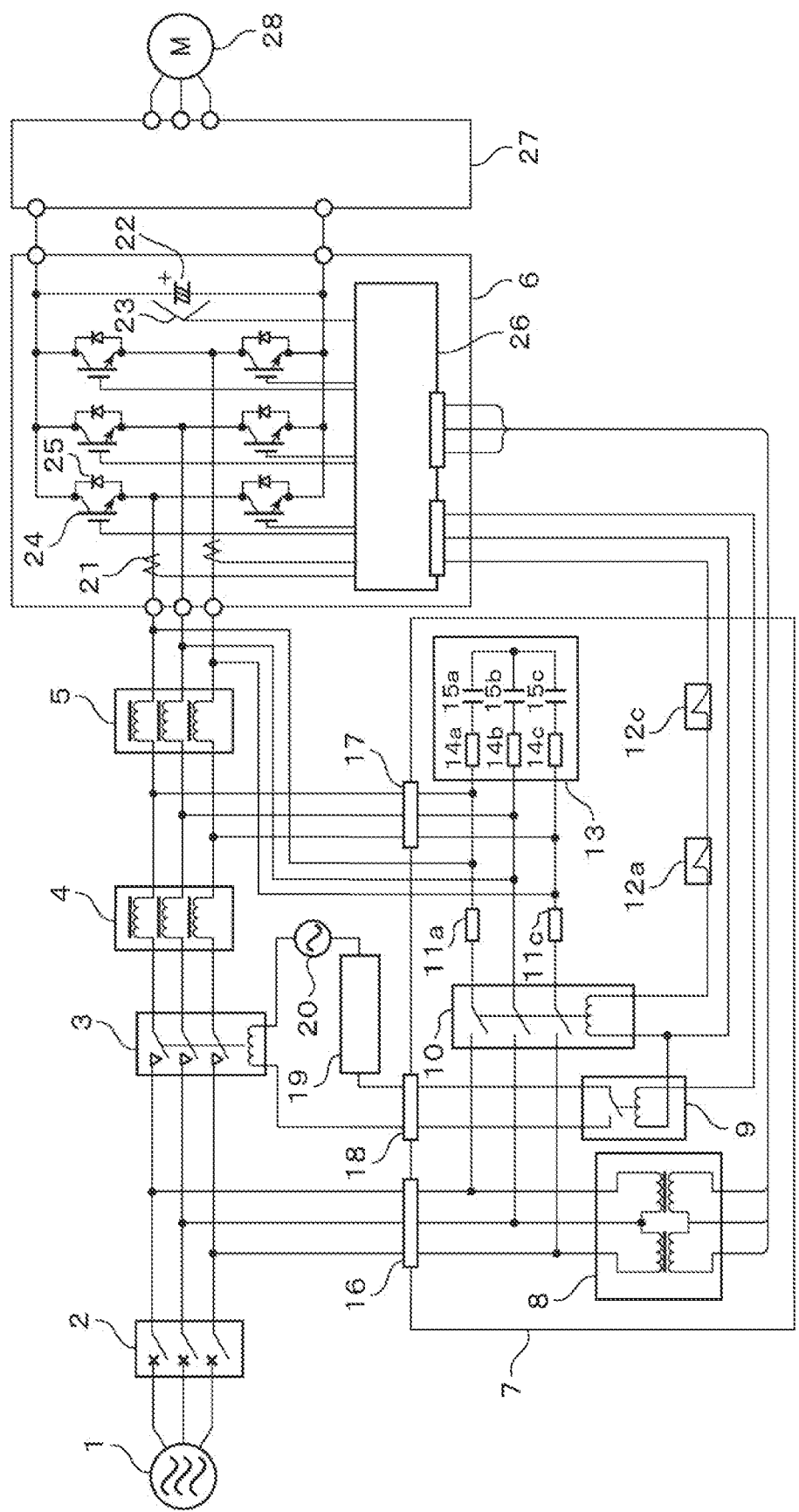
FIG. 7 is a diagram illustrating a circuit configuration of a power conversion device of a third embodiment.

FIG. 7 is a diagram illustrating a third embodiment. In the embodiment of FIG. 1, the current limiting resistor includes the current limiting resistors 11a, 11b, and 11c for three phases. However, in FIG. 7, two of the three phases are used for the current limiting resistors 11a to 11c. In this case, a current flowing through the current limiting resistor for one phase includes both a current obtained by applying a phase voltage of the power supply voltage to a resistance value RS and a current obtained by applying a line voltage. However, data handled is different from that of the first embodiment, and a control processing method is the same. Further, the same effect as that of the first embodiment can be obtained.

Fourth Embodiment

Figure 8:
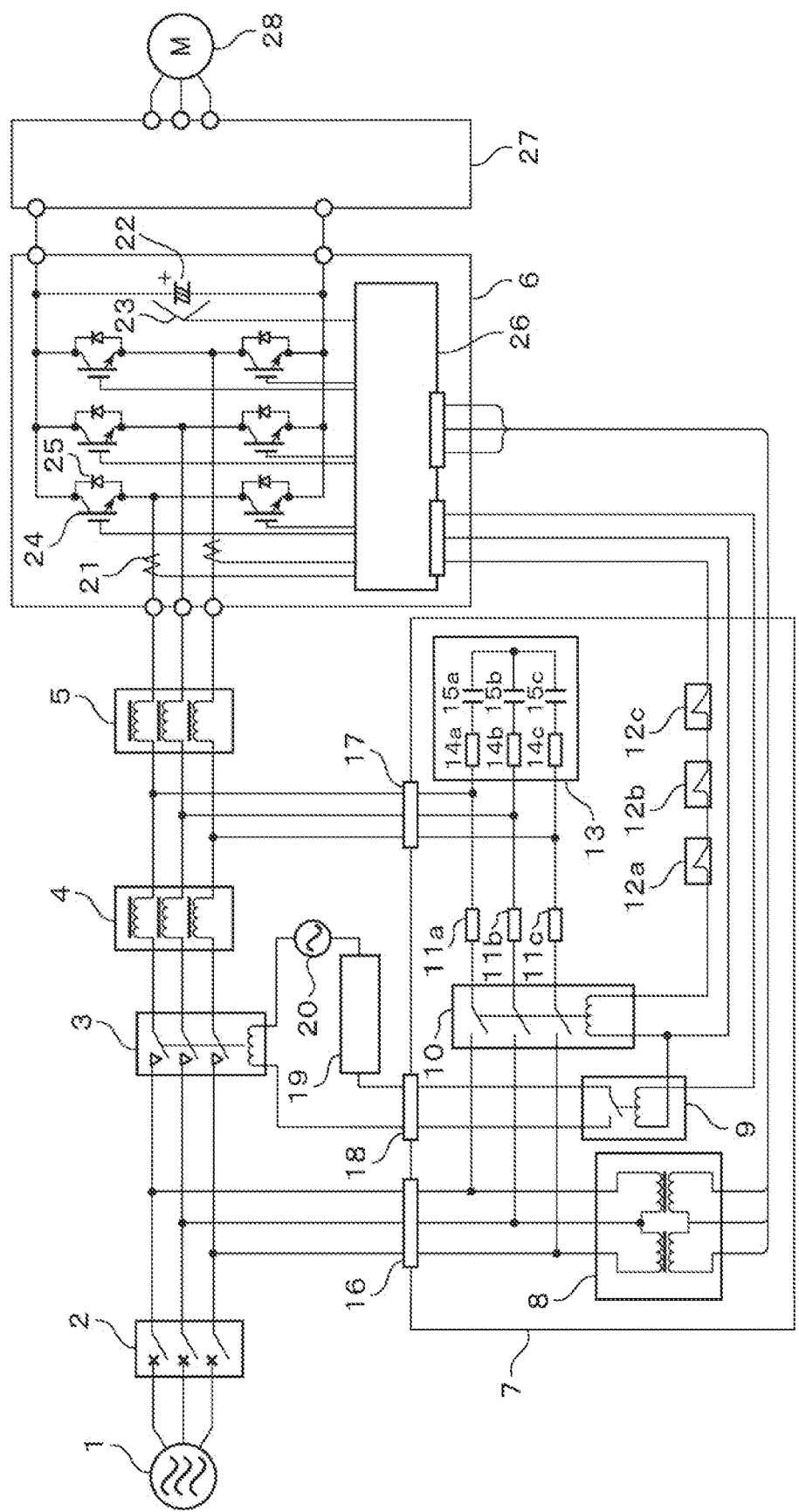
FIG. 8 is a diagram illustrating a circuit configuration of a power conversion device of a fourth embodiment.

FIG. 8 is a diagram illustrating a fourth embodiment. In this example, each of thermal contacts 12a, 12b, and 12c are used for each current limiting resistor in order to protect the current limiting resistors from overheating compared to the first embodiment.

The thermal contacts 12a, 12b, and 12c are normally closed, and when an allowable temperature of the current limiting resistors 11a, 11b, and 11c is exceeded, the thermal contacts 12a, 12b, 12c are open. The thermal contacts 12a, 12b, and 12c are connected in series to a wire for sending a turning-on command $S_1$ from the control unit 26 to the electromagnetic contactor 10 for turning on the current limiting operation in order to turn on the electromagnetic contactor 10 for turning on the current limiting operation. In this way, when the current limiting resistors overheat, the electromagnetic contactor 10 for turning on the current limiting operation is turned on (the main contact of the electromagnetic contactor 10 for turning on the current limiting operation is opened) regardless of a determination operation from the control unit 26, and it is possible to cut off an energy source that continues to be applied to the current limiting resistors 11a to 11c.

By this implementation, even when time $t_1$ when the main electromagnetic contactor 3 is turned on is improperly set in the first embodiment, overheat protection of the current limiting resistors can be performed, so that it is possible to eliminate failed replacement of the resistor.

Further, according to the present embodiment, it is unnecessary to inform the control unit 26 of a contact state of the thermal contact, an operation circuit for cutting off an energy source of the current limiting resistor is not required, reliability of overheat protection of the current limiting resistor can be improved.

As illustrated in FIG. 7, in the third embodiment, two thermal contacts 12a and 12b may be disposed to correspond to the current limiting resistors 11a and 11b for two phases.

In the above embodiment, the device body 6 and the accessories 7 have been described as separate configurations.

Figure 9:
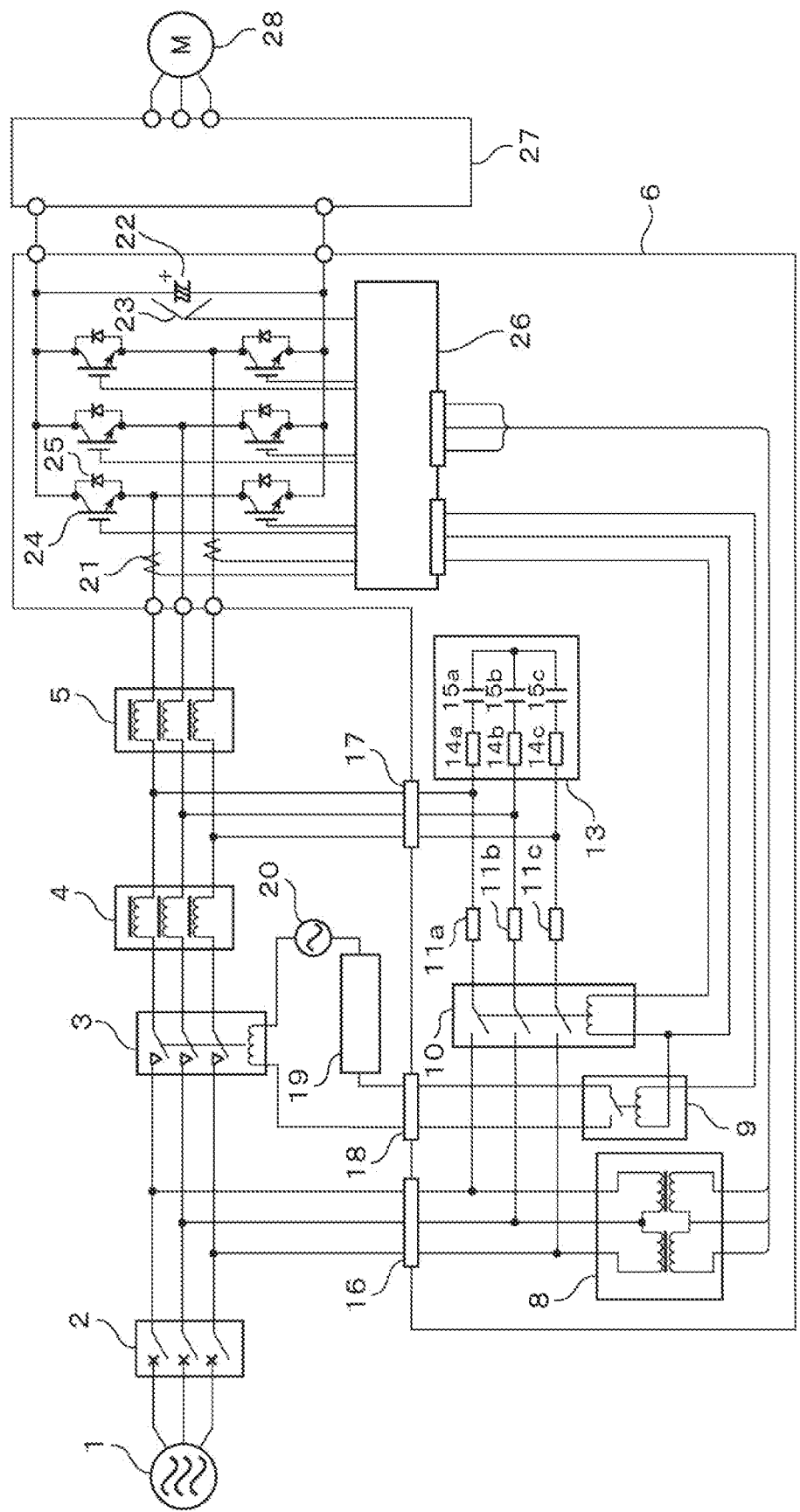
FIG. 9 is a diagram illustrating a modification of the first embodiment.

However, when it is better to integrate the device body 6 and the accessories 7, as illustrated in a modification of FIG. 9, the device body 6 may include the accessories 7.

Fifth Embodiment

Figure 10:
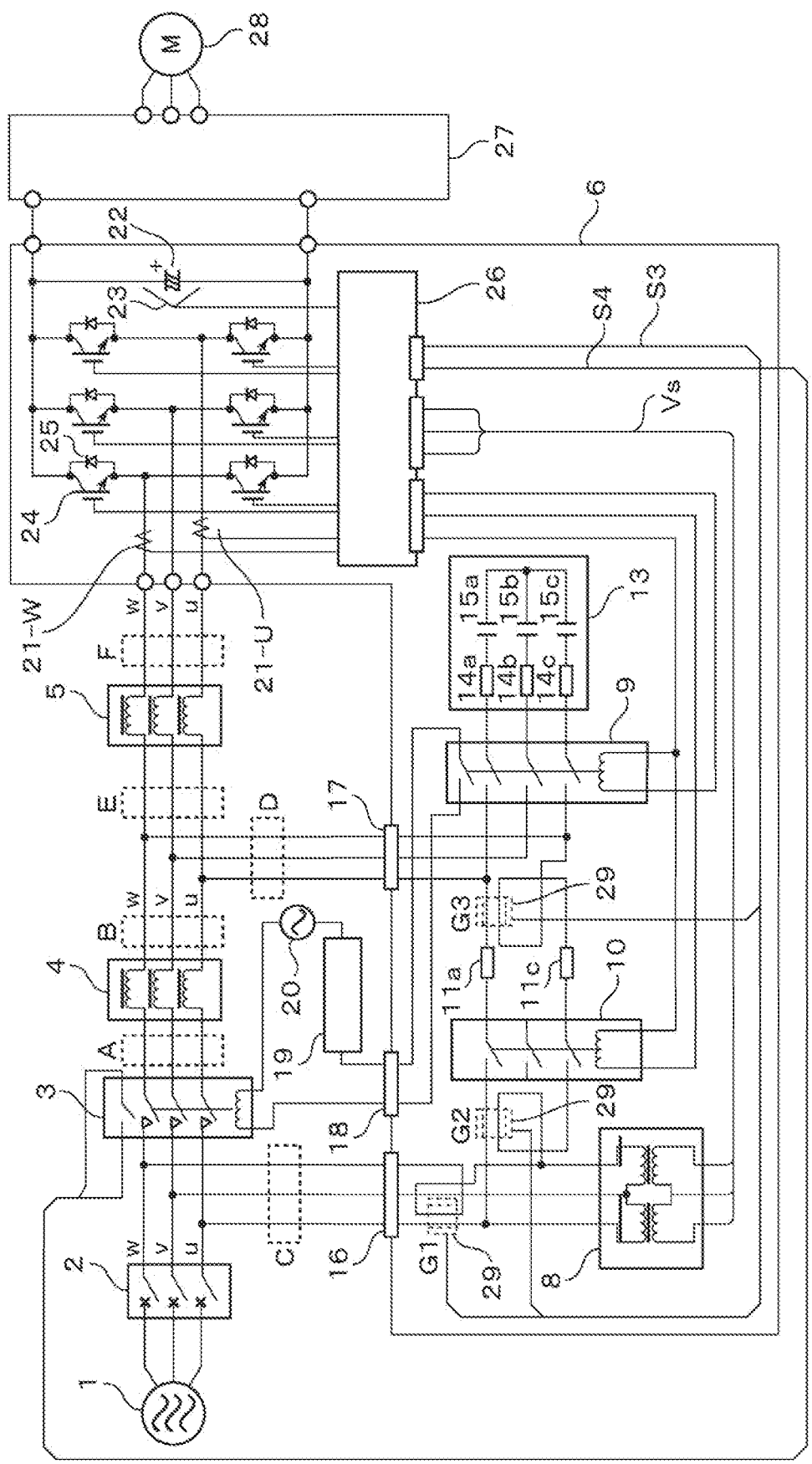
FIG. 10 is a diagram illustrating a circuit configuration of a power conversion device of a fifth embodiment.

FIG. 10 is a diagram illustrating a fifth embodiment of the invention. In the present embodiment, as compared with the first embodiment, the current limiting resistor 11b is eliminated, and an initial charging method by single-phase rectification is used instead of an initial charging method by three-phase rectification. Further, in present embodiment, an AC current detector 29 is disposed at least one place in a path through which the initial charging current flows, that is, at any one of places as illustrated in parts G1 to G3 of FIG. 10. In addition, there is a difference in that the filter circuit 13 is connected via the main contact of the auxiliary electromagnetic contactor 9 for turning on the main electromagnetic contactor.

Even though the present embodiment is different from the other embodiments in this way, the effect obtained by the example of the minimization process of the current limiting resistor 11 and the electromagnetic contactor 10 for turning on the current limiting operation is the same as that of the other examples.

The only difference in the effect of the present embodiment from the other embodiments is that the reliability for preventing the burnout of the current limiting resistance and protecting the wire of the initial charging path is further improved.

In FIG. 10, when there is an erroneous wire at places A to D, that is, when there is a cross wire where different phases are short-circuited at any one of a place of a power line phase up to the AC power supply 1 and the device body (converter) 6, a place of a lead wiring phase to the power-supply phase detection transformer 8, and a place of a lead-in wiring phase from a common connection point of the power supply-side reactor 4 and the device body-side reactor 5, a power short-circuit current flows through the current limiting resistor 11a and 11c and the electromagnetic contactor 10 for turning on the current limiting operation at a moment when the main electromagnetic contactor 3 is turned on. In this case, excessive energy is instantly applied to the resistor, and an element inside the resistor tries to reach a burnout dangerous temperature in a short time. However, at the same time, since this dangerous temperature does not appear on a resistance surface, temperature detection protection by the thermal contact, etc. becomes difficult.

Further, when the electromagnetic contactor 10 for turning on the current limiting operation is continuously turned on while the main electromagnetic contactor 3 is OFF, the filter current continues to flow through the current limiting resistor 11. When these problems occur, the current limiting resistor 11 is burnt out. The present embodiment is an embodiment for solving these problems. The details of the mode are shown below.

As a combination of erroneous wires of parts A to D, there are cross wires of a phase V and a phase U, the phase V and a phase W, and the phase W and the phase U. In the case of the cross wire of the phase V and the phase U, a V-U line voltage is applied to the resistor 11a. In the case of the cross wire of the phase V and the phase W, a V-W line voltage is applied to the resistor 11c. In the AC current detector 29, a short-circuit current is generated in each penetrating wire on only one side. In the case of the cross wire of the phase W and the phase U, a W-U line voltage is applied to each of the current limiting resistors 11a and 11c, and a short-circuit current flows through the two penetrating wires.

In this case, even when a penetration direction of either one wire is penetrated in a direction that does not cancel the magnetic flux and an output of a secondary current signal S3 of the AC current detector 29 is reduced due to the saturation of the magnetic flux, the AC current detector 29 obtains this signal S3 at least, and sends the signal S3 to the control unit 26 to obtain short-circuit information. Only when this information and a feedback signal S4 for turning on the main electromagnetic contactor 3 are present, the control unit 26 immediately cancels a charging command of the auxiliary electromagnetic contactor 9 for turning on the main electromagnetic contactor and outputs an alarm for the erroneous wire so that energy cannot be continuously applied to the current limiting resistor.

According to the present embodiment, since the detection is based on the electric current, it is possible to detect the abnormality at a time when the resistor does not reach the abnormal temperature. Further, as the AC current detector 29, it is possible to use a relatively inexpensive one. Therefore, it is more advantageous than other embodiments in terms of reliability and cost.

Next, in the case of the cross wire of the phase V and the phase U even when the parts E and F are erroneous wires, the initial charging current flowing into the smoothing capacitor 22 of the device body (converter) 6 passes only through a W-phase current detector 21-W. In addition, in the case of the cross wire of the phase V and the phase W, the current passes only through a U-phase current detector 21-U. In addition, in the case of the cross wire of the phase U and the phase W, the current pass through both the current detectors 21-U and 21-W. However, a phase relationship between a phase of a signal VS obtained by the power-supply phase detection transformer PT and current information obtained by the current detector 21-U or 21-W is different between at the time of an erroneous wire and at the time of a normal wire. The control unit 26 determines these things, outputs alarm for the erroneous wire, and inhibits the main electromagnetic contactor 3 from issuing a turning-on command.

Next, as a means for preventing the filter current from continuously flowing through the current limiting resistor, the current limiting resistors 11a and 11c or the electromagnetic contactor for initial charging (the electromagnetic contactor 10 for turning on the current limiting operation) and the filter circuit 13 are connected via the main contact of the auxiliary electromagnetic contactor 9 for turning on the main electromagnetic contactor. Further, the problem is solved by using the main contact of the auxiliary electromagnetic contactor 9 for turning on the main electromagnetic contactor or a point where a potential is electrically the same as that of the main contact as a common connection point with a point drawn from a common connection point between the power supply-side reactor 4 and the device body (converter)-side reactor 5.

That is, when the auxiliary electromagnetic contactor 9 for turning on the main electromagnetic contactor is turned on, the main electromagnetic contactor 3 is turned on, and the filter current passes through the main contact of the main electromagnetic contactor 3 and does not pass through the current limiting resistors 11a and 11c. In addition, when the main electromagnetic contactor is not turned on, that is, when the auxiliary electromagnetic contactor 9 for turning on the main electromagnetic contactor 9 is turned off, the filter circuit 13 is separated from the power supply and the current limiting resistors 11a and 11c. Thus, the filter current does not flow through the current limiting resistors 11a and 11c, and the current limiting resistors 11a and 11c are not overheated or burnt.

According to the fifth embodiment, it is possible to further improve the reliability for preventing the current limiting resistor from burning, and it is unnecessary to install a fuse-free breaker for wire protection or a fuse for wire protection in the part C.

REFERENCE SIGNS LIST

1 Main power supply
2 Main breaker
3 Main electromagnetic contactor
4 Power supply-side reactor
5 Device body-side reactor
6 Device body
7 Accessories
8 Power-supply phase detection transformer
9 Auxiliary electromagnetic contactor for turning on main electromagnetic contactor
10 Electromagnetic contactor for turning on current limiting operation 13 Filter circuit
16 Power-supply phase detection transformer input terminal
17 Filter terminal
18 Amplification contact output terminal for turning on main electromagnetic contactor
21 Current detector
22 Smoothing capacitor
23 DC voltage detector
24 IGBT element
25 Flywheel diode
26 Control unit
29 AC current detector

The invention claimed is:

1. A power conversion device comprising:
a main breaker and a main electromagnetic contactor connected to a main power supply;
a converter body having a switching element;
a power supply-side reactor and a device body-side reactor connected to the main electromagnetic contactor;
a current detector;
a smoothing capacitor;
a DC voltage detector that detects a voltage of the smoothing capacitor;
a control unit; and
accessories, wherein
the accessories include:
a power-supply phase detection transformer that detects a phase and an amplitude of a power supply voltage;
a current limiting resistor that suppresses rush current to the smoothing capacitor at an initial turning-on stage of the main power supply;
an electromagnetic contactor for turning on a current limiting operation, the electromagnetic contactor connecting the current limiting resistor and the main power supply; and
a filter circuit that removes current ripples caused by switching of the switching element,
the main breaker, the main electromagnetic contactor, and an input terminal of the power-supply phase detection transformer in the accessories are connected to one another, and
the power supply-side reactor, the device body-side reactor, and a filter terminal in the accessories are connected to one another.

2. The power conversion device according to claim 1, wherein the control unit performs a control operation to turn on the main electromagnetic contactor according to a turning-on time when the main electromagnetic contactor is turned on.

3. The power conversion device according to claim 2, wherein the control unit determines the turning-on time based on detection information from the power-supply phase detection transformer, the current detector, and the DC voltage detector, and performs a control operation to turn on the main electromagnetic contactor according to the turning-on time.

4. The power conversion device according to claim 2, wherein the turning-on time is found in advance, and the turning-on time is given to the control unit as a manual set value.

5. The power conversion device according to claim 1, wherein
a lead-in wire to the power-supply phase detection transformer and a primary-side wire of the electromagnetic contactor for turning on the current limiting operation are shared,
a secondary-side wire of the electromagnetic contactor for turning on the current limiting operation and an input-side wire of the current limiting resistor are shared, and
an output-side wire of the current limiting resistor and a lead-in wire to the filter circuit are shared.

6. The power conversion device according to claim 1, wherein
a lead-in wire to the power-supply phase detection transformer and an input-side wire of the current limiting resistor are shared,
a primary-side wire of the electromagnetic contactor for turning on the current limiting operation and an output-side wire of the current limiting resistor are shared, and
a secondary-side wire of the electromagnetic contactor for turning on the current limiting operation and a lead-in wire to the filter circuit are shared.

7. The power conversion device according to claim 1, wherein a circuit of the current limiting resistor has three phases or two phases.

8. The power conversion device according to claim 1, wherein, when the current limiting resistor is heated, a contact for opening a main contact of the electromagnetic contactor for turning on the current limiting operation is included.

9. The power conversion device according to claim 1, wherein
the current limiting resistor or the electromagnetic contactor for turning on the current limiting operation and the filter circuit are connected to each other via a main contact of an auxiliary electromagnetic contactor for turning on the main electromagnetic contactor, and
a main terminal portion on a side not connected to the filter circuit of the auxiliary electromagnetic contactor or a point where a potential is electrically the same as a potential of the main terminal portion is used as a common connection point with a point drawn from a common connection point between the power supply-side reactor and the device body-side reactor.

10. The power conversion device according to claim 1, wherein
a circuit of the current limiting resistor is a single-phase rectification charging circuit,
an AC current detection is provided in a path through which an initial charging current flows, and
when the main electromagnetic contactor is turned on, and when there is a cross wire where different phases are short-circuited at any one of a place of a power line phase up to an AC power supply and a converter body, a place of a lead wiring phase to the power-supply phase detection transformer, and a place of a lead-in wiring phase from a common connection point of the power supply-side reactor and the device body-side reactor, the control unit cancels a turning-on command of the main electromagnetic contactor so that energy is not allowed to be continuously applied to the current limiting resistor based on a current flowing through an initial charging current path generated by the cross wire, and outputs alarm for an erroneous wire.

* * * * *